United States Patent
Nambannor Kunnath et al.

(10) Patent No.: US 12,119,948 B2
(45) Date of Patent: Oct. 15, 2024

(54) SYSTEMS AND METHODS FOR MANAGED MEETING ROOMS

(71) Applicant: VMWARE, INC., Palo Alto, CA (US)

(72) Inventors: Ramanandan Nambannor Kunnath, Bangalore (IN); Rohit Pradeep Shetty, Bangalore (IN)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 18/124,003

(22) Filed: Mar. 21, 2023

(65) Prior Publication Data

US 2024/0243941 A1      Jul. 18, 2024

(30) Foreign Application Priority Data

Jan. 12, 2023    (IN) .............................. 202341002426

(51) Int. Cl.
     *H04L 12/18*        (2006.01)

(52) U.S. Cl.
     CPC ...... *H04L 12/1831* (2013.01); *H04L 12/1818* (2013.01)

(58) Field of Classification Search
     CPC .......................... H04L 12/1831; H04L 12/1818
     See application file for complete search history.

(56) References Cited

U.S. PATENT DOCUMENTS

| | | | |
|---|---|---|---|
| 8,737,965 B2 * | 5/2014 | McCown | H04W 12/122 455/410 |
| 2008/0091486 A1 * | 4/2008 | Aoyama | G06Q 10/06398 705/7.42 |
| 2016/0005003 A1 * | 1/2016 | Norris | H04L 65/403 455/456.3 |
| 2016/0105553 A1 * | 4/2016 | Forrester | H04M 3/42365 455/416 |
| 2019/0268387 A1 * | 8/2019 | Pelton | G06Q 10/10 |
| 2023/0275892 A1 * | 8/2023 | Pati | G10L 17/06 726/6 |

* cited by examiner

*Primary Examiner* — Nazia Naoreen
(74) *Attorney, Agent, or Firm* — Kim & Stewart LLP

(57) ABSTRACT

Disclosed are various embodiments for preventing unauthorized access to materials presented in a meeting room. In one example, a system comprises a computing device that is configured to identify a list of invited users for a meeting occurring in a meeting room and to detect a client device of an uninvited user that has entered the meeting room. An uninvited user notification is transmitted to a remote computing device. A suspension command is received for the meeting room from the remote computing device based on the uninvited user notification. The computing device is configured to enforce a suspension action on a meeting room device located in the meeting room based on the suspension command.

20 Claims, 6 Drawing Sheets

SYSTEMS AND METHODS FOR MANAGED MEETING ROOMS

RELATED APPLICATIONS

Benefit is claimed under 35 U.S.C. 119(a)-(d) to Foreign Application Serial No. 202341002426 filed in India entitled "SYSTEMS AND METHODS FOR MANAGED MEETING ROOMS", on Jan. 12, 2023, by VMware, Inc., which is herein incorporated in its entirety by reference for all purposes.

BACKGROUND

Organizations conduct business meetings for discussing information with a group of users. In some cases, the business meetings are restricted to a set of particular users. Internet of Things (IoT) devices can assist with the execution of these meetings. For example, many conference rooms have IoT devices such projectors, microphones, video cameras, electronic-controlled lighting, electronic-controlled security shades, and other suitable IoT devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The embodiments of the present disclosure relate to preventing unauthorized access to material presented in a meeting room. Organizations conduct meetings for discussions with a group of users. In some cases, these meetings are restricted to a limited set of users because confidential information is being shared during the meeting. Due to the confidentiality of the content being presented, the meeting can be an opportunity for unauthorized users to access the confidential information. For example, an uninvited user may walk into the meeting room undetected by other individuals and have access to the confidential information being discussed. In another example, a host or presenter during the meeting may temporarily leave the meeting room while confidential information is being displayed. In this scenario, an unauthorized user may walk by an open door to the meeting room or walk into the meeting room while the meeting is temporarily paused due to the absence of the host or presenter.

The various embodiments of the present disclosure are related to preventing unauthorized access to material shared during a meeting, in which the material is intended for a restricted group of users. The embodiments can be used to detect an uninvited user that has entered a meeting room. Upon detecting the uninvited user, the embodiments can be directed to instruct one or more devices in the meeting room to secure the confidential information. As such, one or more devices in the meeting room can be instructed to enter a security or suspension mode that prevents unauthorized users from accessing the confidential information. The security or suspension mode can be directed by a user-specified policy which dictates which actions the devices should take based on a set of conditions. Additionally, the embodiments can be used to monitor the meeting participants and detect when one of the participants (e.g., a host or a presenter) has left the meeting room. If a particular meeting participant (e.g., a host or a presenter) has left the room, the embodiments can instruct one or more devices in the meeting room to enter a security or suspense mode directed by a user-specified policy to prevent unauthorized access to the material while the meeting is paused.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
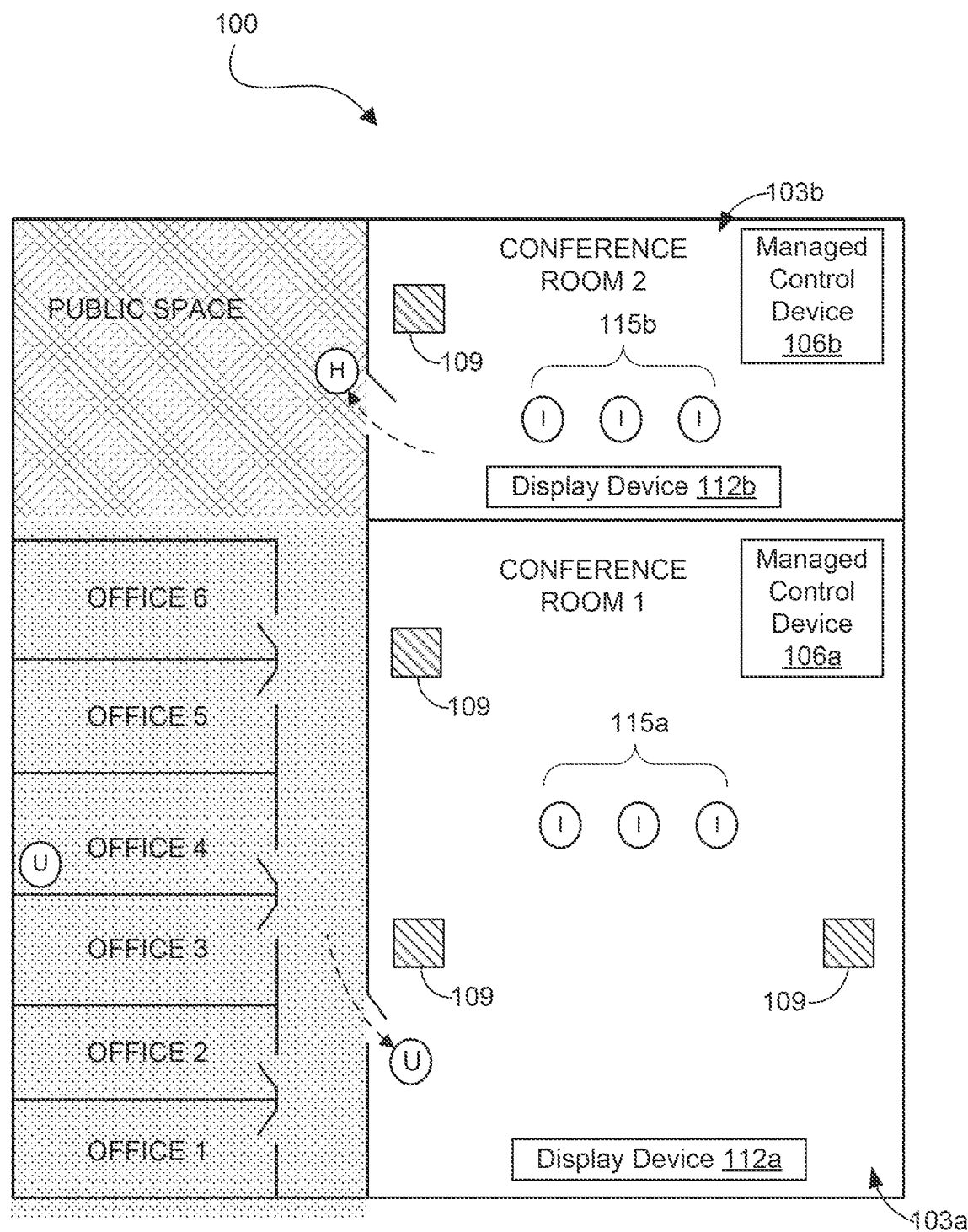
FIG. 1 is a pictorial diagram of a floor layout that includes meeting rooms of an organization according to various embodiments of the present disclosure.

As illustrated in FIG. 1, shown is a pictorial diagram of a floor layout 100 of a facility for an organization. The floor layout 100 includes multiple meeting rooms 103a, 103b (collectively referred to as "the meeting rooms 103") (e.g., conference rooms 1 and 2), offices, public space, and other areas. As shown in FIG. 1, the meeting rooms 103 can include managed control devices 106a, 106b (collectively referred to as "managed control devices 106") and other types of meeting room devices. The managed control device 106 can be a device that is used to manage the meeting room devices, such as beacon devices 109 (e.g., WIFI access points, lighting devices, smart speakers, video cameras, thermostat controllers), display devices 112, client devices, and other suitable Internet of Things (IoT) devices. The beacon devices 109 can have a known, fixed location in the meeting room 103. The managed control devices 106 can be used to enforce a remedial action on the meeting room devices based on a set of conditions that have been detected in the meeting room 103. The action can be determined based on a user-specified policy (e.g., an administration user). For instance, a remedial action can include disabling a display device 112, reducing or turning off the light for a lighting device, manipulating blinds or security shades, wiping a memory or a client device, locking a client device, and other suitable remedial actions. The managed control device 106 can be located in the meeting room 103 or it could be situated outside of the meeting room 103. Each managed control device 106 can manage one or more meeting rooms 103 containing devices.

The managed control devices 106 can be in data communication with a remote computing device. The remote computing device can control or manage the operations of the managed control device 106. The remote computing device can transmit one or more policies (e.g., configuration settings and/or conditional instructions) to the managed control device 106. In turn, the managed control device 106 can enforce instructions from the remote computing device on the meeting room devices. In the floor layout 100, users are represented with circles with "I" in FIG. 1 and assumed to have a client device that is enrolled with the remote computing device.

As a first example in meeting room 103a (i.e., conference room 1), the managed control device 106a is managing devices in the meeting room 103 during a meeting and detects the presence of an uninvited user. The managed control device 106a can have a first list of invited users 115a for the meeting. The managed control device 106a can detect the presence of each of the users using nearby location detection techniques (e.g., Bluetooth®, NFC, WIFI detection, sound detection, peer-2-peer detection, etc.). The managed control device 106a can verify whether each user was invited to the meeting. In FIG. 1, the managed control device 106a has detected an uninvited user (e.g., circle with "U" in FIG. 1) entering the meeting room 103a for the meeting. The managed control device 106a can identify the uninvited user by identify the client device associated with the uninvited user. The client device can be used to identify a particular user profile and can be used to determine that the particular user profile was not included on the first list of invited users 115a for the meeting.

Upon detecting the uninvited user, the managed control device 106 can transmit a suspension instruction to the display device 112a in the meeting room 103a. Other meeting room devices can receive the suspension instruction, such as a lighting device can flicker its lighting source to indicate an uninvited user is in the meeting room 103a. The managed control device 106a and/or the remote computing device can provide a notification to the client device of the uninvited user to leave the meeting room 103. Upon the uninvited user leaving the meeting room 103a, the managed control device 106a can provide instructions to the meeting room devices to release the suspension action or resume a previous operation.

As a second example in meeting room 103b (i.e., conference room 2), the managed control device 106b is managing devices in the meeting room 103b during a meeting and detects a meeting participant (e.g., circle with an "H") has left the meeting room 103b. In this scenario, the meeting participant that has left may be a meeting host or a presenter for the meeting. The managed control device 106b can have a second list of invited users 115b. In this example, a host or a presenter among the second list of invited users 115b can be identified. Upon the detection of a host or a presenter leaving the meeting room 103b, the managed control device 106b can provide instructions to the meeting room devices. For instance, the display device 112b can receive an instruction to turn off its display and audio. Upon the detection of the host of the presenter reentering the meeting room 103b, the managed control device 106b can provide instructions for the meeting room devices to resume a previous operation.

Figure 2:
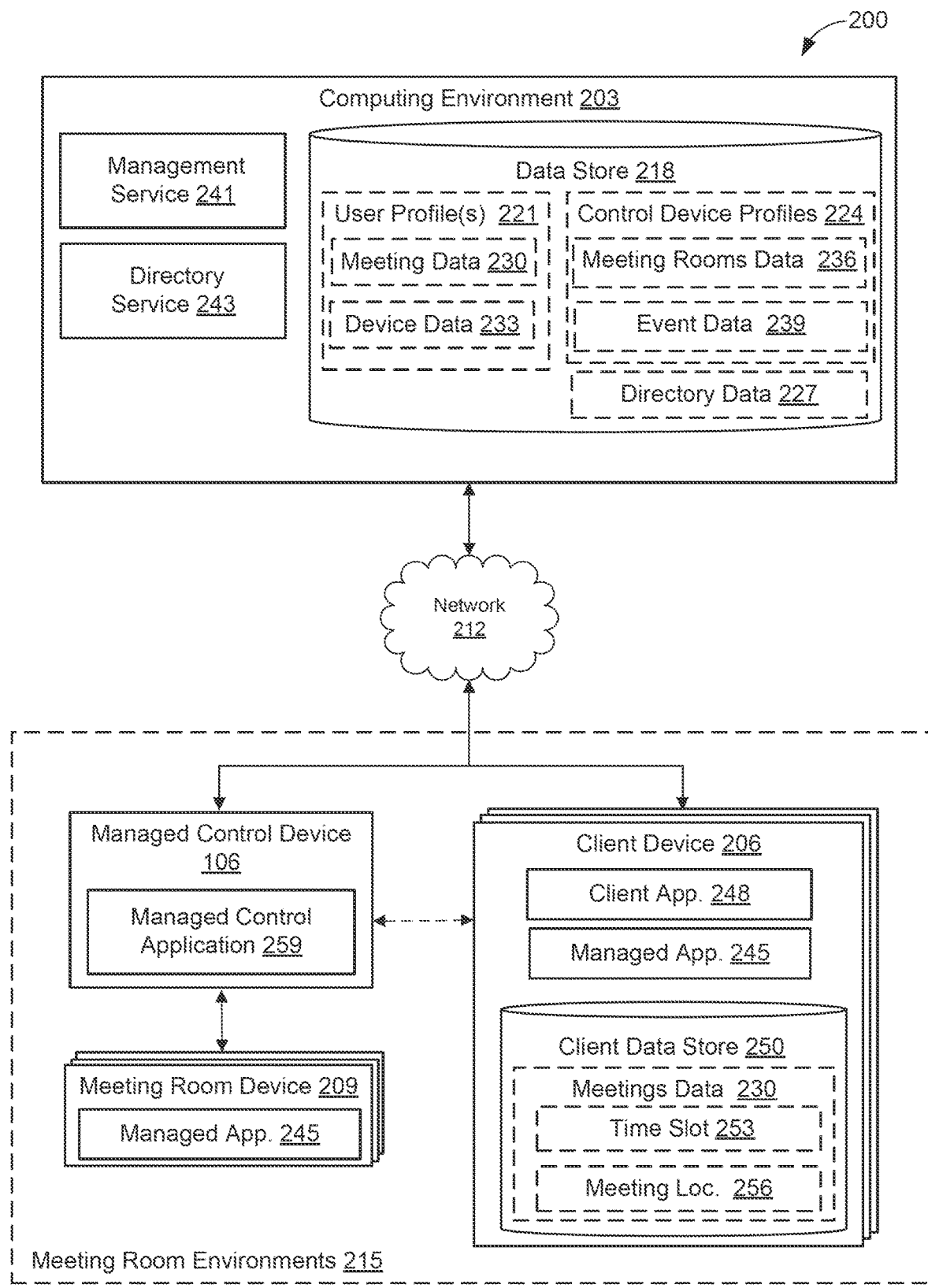
FIG. 2 is a drawing of a network environment according to various embodiments of the present disclosure.

With reference to FIG. 2, shown is a network environment 200 according to various embodiments. The network environment 200 can include a computing environment 203, a client device 206, a managed control device 106, and a meeting room device 209 and a data store 218, which can be in data communication with each other via a network 212. The managed control device 106, the meeting room device 209, the client device 206 can represent a meeting room environment 215, which can be managed by the managed control device 106 and/or the client device 206.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that can include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource, or any other distributed computing arrangement. In some cases, the computing environment 203 can correspond to an elastic computing resource where the allotted capacity of processing, network, storage, or other computing-related resources can vary over time.

Various data is stored in a data store 218 that is accessible to the computing environment 203. The data store 218 can be representative of a plurality of data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store 218. The data stored in the data store 218 is associated with the operation of the various applications or functional entities described below. The data in the data store 218 can include user profiles 221, a control device profile 224, directory data 227, and potentially other data.

The user profile 221 can represent an account or a profile for each user that has enrolled with a management service of the computing environment 203. Each user profile 221 can include user credentials and a unique identifier to distinguish it from other user profiles 221. Additionally, the user profile 221 can include meeting data 230 and device data 233. The meeting data 230 can represent meeting data 230 associated with a calendar of the user. The meeting data 230 can include a meeting room 103 (e.g., meeting room location, meeting room identifier), a time slot, a list of invited users 115, a meeting participant identified as host or presenter and other suitable data.

The device data 233 can represent data associated with the client device 206 of an enrolled user with the management service. The device data 233 can include a unique device identifier, such as a phone number, a device serial number, an International Mobile Equipment Identity (IME) number, a unique identifier for an operating system, and other suitable device identifiers. The device data 233 can include a list of hardware components for the client device 206, a list of software (e.g., applications) installed on the client device 206, an operation system (e.g., version number, etc.), compliance checks performed, a device department group (e.g., marketing group, engineering testing group, executive officer status, etc.), and other suitable data. The device data 233 can include location data provided by the client device 206 and the locations of nearby (e.g., within a threshold distance) client devices 206.

The control device profile 224 can represent data associated with a particular managed control device 106 located in a particular meeting room 103. The control device profile 224 can include meeting room data 236, event data 239, and other suitable data. The meeting room data 236 can include a list of meeting room devices 209 that the managed control device 106 is managing or controlling in the meeting room 103, data associated with the meeting that are scheduled to be conducted in the meeting room 103 (e.g., time slot, invited attendees, presentation material, a meeting type), and other suitable meeting room data.

The event data 239 can include a log of events that have occurred in the meeting room 103. The event can include an attendance record for those of the invited users actually attended a meeting, data associated with an uninvited user that entered the meeting room (e.g., time uninvited user entered and left the meeting room, device identifier for the client device 206 of the uninvited user), and other suitable data.

The directory data 227 can represent data that associated with credentials, permissions, and access associated with each user profile 221. For instances, the directory data 227 can include login credentials, passwords, and other suitable data for authenticating an identity of a client device 206 requesting access to a resource in the computing environment 203 and/or the meeting room environment 215. In some examples, the directory data 227 can represent data stored in association with the Active Directory from Microsoft®.

Various applications or other functionality can be executed in the computing environment 203. The components executed on the computing environment 203 include a management service 241, a directory service 243, and other applications, services, processes, systems, engines, or functionality not discussed in detail herein.

The management service 241 can be executed to manage the operation of the meeting room environment 215. The management service 214 can transmit one or more meeting policies to the managed control device 106, the meeting room devices 209, and/or the client device 206. The meeting policy can be used to direct devices in the meeting room environment 215 to enforce a particular remedial action based on a set of conditions occurring in the meeting room 103. The meeting policy can be specified by user (e.g., administrative user).

The directory service 243 can be executed to access credential and permissions for the user profile 221. In some examples, the management service 241 can access or invoke the directory service 243 to verify an identity of a user and the access level/permissions for the user to access resources (e.g., meeting rooms 103, network resources, meeting room devices 209, etc.).

The meeting room environment 215 can represent a networked area within a meeting room 103. The meeting room environment 215 can include a managed control device 106, meeting room devices 209, client devices 206, and other suitable components, which can be in data communication via the network 212, a local network, a personal area network, and other suitable networks. In some non-limiting examples, the managed control device 106 can be in data communication with the computing environment 203. The managed control device 106 can provide data to the computing environment 203 and can receive commands from the computing environment 203. The managed control device 106 can enforce the commands on the meeting room devices 209 and/or the client device 206. Each managed control device 106 can manage one or more meeting room environments 215.

The client device 206 is representative of a plurality of client devices that can be coupled to the network 212. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a managed application 245, a client application 248, or other applications. The managed application 245 can be executed in order to facilitate control of the operation of the client device 206 by the managed control application 259 and/or the management service 241. The managed application 245 can receive instructions or commands from the managed control device 106 and/or the computing environment 203 (e.g., the management service 241). The managed application 245 can be downloaded and installed during an enrollment process with the management service 241. The client application 248 can be executed in a client device 206 to access network content served up by the computing environment 203 or other servers, thereby rendering a user interface on the display. To this end, the client application 248 can include a browser, a dedicated application, or other executable, and the user interface can include a network page, an application screen, or other user mechanism for obtaining user input. The client device 206 can be configured to execute applications beyond the client application 248, such as email applications, social networking applications, word processors, spreadsheets, or other applications.

Various data is stored in a client data store 250 that is accessible to the client device 206. The data stored in the client data store 250 is associated with the operation of the various applications or functional entities described in association with the client device 206. The data in the client data store 250 can include meeting data 230 for a user of the client device 206. The meeting data 230 can represent data associated with calendar meetings. The meeting data 230 can include time slot 253, meeting location 256, list of invited users 115, and other suitable data. The time slot 253 can represent a time period for a scheduled meeting and the meeting location 256 can represent an identifier for a meeting room 103 or a meeting location.

The managed control device 106 can be used to manage or control the meeting room environment 215. The managed control device 106 can be used to control the operations of the meeting room devices 209 and/or the client devices 206 located in the meeting room 103. The managed control device 106 can be used for offloading computing and management tasks from the computing environment 203 and for providing faster responses to data sources in the meeting room environment 215. For example, the managed control device 106 can be used to provide faster responses for requests from the meeting room devices 209 or a client device 206 than the computing environment 203. In some examples, the managed control device 106 can be representative of an edge control device, an edge server, or other suitable computing devices at situated at an edge of a particular network. In some examples, the managed control device 106 can be a personal computer, laptop, a tablet, and other suitable computing devices. Additionally, the managed control device 106 can be situated in the meeting room 103, on the same floor as meeting room, offsite from the meeting room, and at other suitable locations.

The managed control device 106 can include a managed control application 259 that is associated with the management service 241. The managed control application 259 can be executed to enforce a meeting room policy on the meeting room devices 209 and/or the client devices 206 in a meeting room 103 of the managed control device 106. The meeting room policy can be specified by a user (e.g., an administrative user). The meeting room policy can include instructions for enforcing a remedial action in response to detecting a set of conditions (e.g., an uninvited user detected, a host or presenter has a left the room) occurring in the meeting room environment 215.

The meeting room devices 209 can represent IoT devices that are located in the meeting room 103. Some examples of meeting room devices 209 can include a display device (e.g., projector), a speaker (e.g., a conference speaker), a microphone, a lighting device, a thermostat device, electronic controlled window blind, a wireless access point, a camera (e.g., image camera, thermal camera), beacon devices and other suitable devices.

The meeting room devices 209 can include a managed application 245 that is associated with the management service 241. The managed application 245 can receive instructions from the management service 241 and/or the managed control device 106. The instructions can be used to enforce a particular remedial action for a set of conditions that have been detected in the meeting room environment 215. The remedial action can be determined based on a device type associated with the meeting room device 209. For instance, the managed control device 106 can determine to place the meeting room devices 209 in a suspension mode, in which the suspension mode is determined based on a set of detected conditions in the meeting room environment 215. The suspension mode for a display device can include a different action (e.g., turn off display) from a lighting device (e.g., dim the light in the meeting room).

Next, a general description of the operation of the various components of the network environment 200 is provided. To begin, the managed application 245 can be installed on the client devices 206 of the users and the managed control application 259 can be installed on the managed control device 106. The managed control device 106 can detect the presence of client devices 206 entering a particular meeting room 103 via the managed application 245.

When a non-invitee comes into the meeting room 103, the managed control application 259 on the managed control device 106 can detect the non-invitee (uninvited) user via the meeting room devices 209 (e.g., utilizing BLE beacons, NFC, wi-fi access points, microphones, etc.) communicating with the managed application 245 present on the uninvited end user's client device 206. As soon as the uninvited user is detected within a threshold of close proximity, the managed control application 259 of the managed control device 106 inside the meeting room 103 can inform the management service 241 about the presence and credentials of the non-invitee. The management service 241 can correlate the data obtained from the uninvited user's device data with the respective back-end systems (e.g., directory service 243, human resource systems, etc.) and figures out if the user has entered or has not entered the room in real-time. In such cases, the management service 241 can issue a suspend command to the managed control application 259 in the meeting room 103. When the managed control application 259 receives the suspend command, the manage control application 259 can suspend the meeting and sensitive content being played or displayed on the display device 112 (e.g., Smart TV), which prevents data being leaked to the uninvited end user.

In some examples, using the meeting room devices 209, such as a thermal imaging camera or a camera with object detection functionality, in the meeting room 103, the managed control device 106 can make sure that the count of the listed invited users 115 for the meeting matches the count of users present in the meeting room 103. Thus, a camera in the meeting room 103 can be used to identify a count of users in the meeting room 103. If there is a count mismatch, the managed control device 106 can inform the management service 241, and then the management service 241 can correlate the count mismatch with the data from the managed application 245 of the client devices 206 present in the meeting room 103 which are compliant. If a mismatch is detected, the management service 241 can instruct the managed control device 106 to suspend the meeting. Additionally, the management service 241 can make use of the nearby APIs to find peer client devices 206 and meeting room devices 209 nearby to make sure the client devices 206 of the users are in close proximity to one another when the meeting is in progress.

Figure 3:
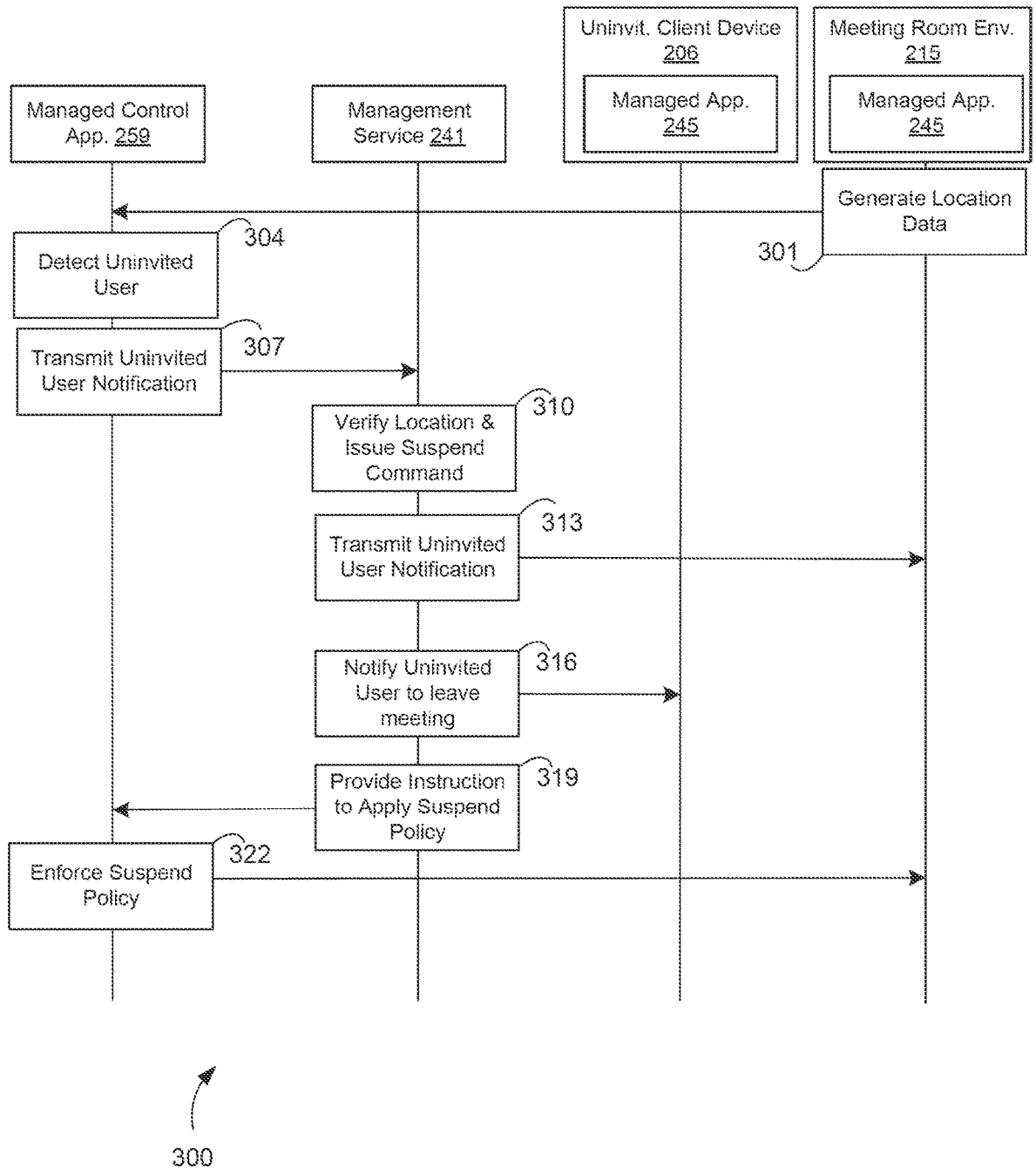
FIG. 3 is a sequence diagrams that provide examples of functionality implemented by components of the network environment of FIG. 2 according to various embodiments of the present disclosure.

Referring next to FIG. 3, shown is a sequence 300 of operations performed in the network environment 200 (FIG. 2). It is understood that the sequence diagram of FIG. 3 provides merely an example of the many different types of interactions that can occur between the depicted components of the network environment 200. As an alternative, the sequence diagram of FIG. 3 may be viewed as depicting an example of elements of a method implemented in the network environment 200 (FIG. 2) according to one or more embodiments.

Beginning with box 301, the managed application 245 of the client devices 206 and/or the meeting room devices 209 can generate location data associated with all of the client devices 206 that have entered the meeting room 103. In some examples, the location data can be generated by the beacon notifications captured by meeting room devices 209 (e.g., a beacon device), client devices 206 reporting nearby peer client devices, and other suitable techniques.

In box 304, the managed control application 259 can determine a client device 206 of an uninvited user is in the meeting room 103. The client devices 206 that have entered the meeting room 103 can be compared to a list of device identifiers associated with the list of invited users 115 for the meeting. A client device 206 that is not on the list of invited users 115 can be identified as an uninvited user.

In box 307, the managed control application 259 can transmit an uninvited user notification to the management service 241. The uninvited user notification can include a device identifier and/or a user profile 221 (e.g., user credential) associated with the client device 206 of the uninvited user. In some instances, the managed control application 259 provides a list of all device identifiers present in the meeting room 103 and the management service 241 can identify an uninvited user.

In box 310, the management service 241 can verify the location of the client devices 206 for the uninvited users and the invited users. The management service 241 can verify the location of the client devices 206 based on a comparison of various data sources (e.g., location data provided from the managed application 245 of the client device 206, beacon notifications from other meeting room devices 209, and other suitable sensors, etc.). The management service 241 can issue a suspend command to the devices in the meeting room environment 215.

In box 313, the management service 241 can transmit an uninvited user notification to the devices in the meeting room environment 215. For example, the uninvited user notification can be received by the client devices of the invited users and can display an indication that the meeting will be suspended until the uninvited user leaves the meeting room 103.

In box 316, the management service 241 can transmit a notification to the client device 206 of the uninvited user. The notification can state that the uninvited user is not on the list of invited users 115 for the meeting and that the uninvited user needs to leave the meeting room 103.

In box 319, the management service 241 can provide an instruction to the managed control application 259 for applying a suspend policy. Prior to the meeting, the suspend policy can be configured by a user (e.g., an administrative user). The suspend policy can indicate a remedial action to be performed by one or more meeting room devices 209.

In box 322, the managed control application 259 can enforce the suspend policy on the device in the meeting room environment 215. In some instances, the managed control application 259 enforces the suspend policy based on a device type for each meeting room device 209. For example, the display device 112 can be instructed to remove the presently displayed content for meeting. The content can be replaced with a message that states that the meeting has been suspended until the uninvited user has left the meeting room 103. The manage control application 259 can instruct a lighting device to dim or flicker the lights.

Figure 4:
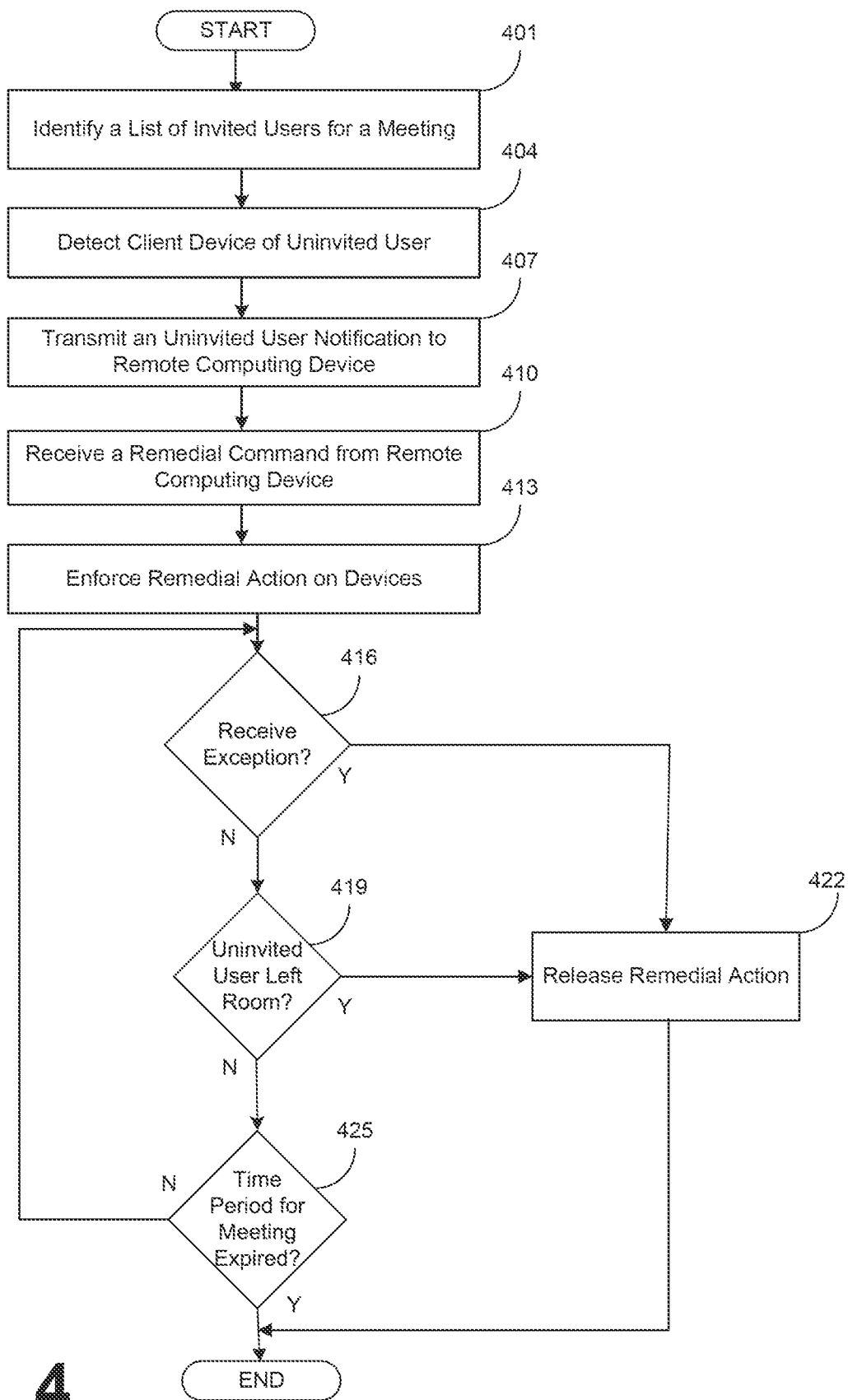
FIG. 4 is a flowchart illustrating one example of functionality implemented as portions of an application executed in a meeting room environment in the network environment of FIG. 2 according to various embodiments of the present disclosure.

Referring next to FIG. 4, shown is a flowchart that provides one example of the operation of a portion of the managed control application 259. The flowchart of FIG. 4 provides merely an example of the many different types of functional arrangements that can be employed to implement the operation of the depicted portion of the managed control application 259. As an alternative, the flowchart of FIG. 4 can be viewed as depicting an example of elements of a method implemented within the network environment 200.

Beginning with block 401, the managed control application 259 can identify a list of invited users 115 for a meeting at a meeting room 103. The list of invited users 115 can be identified based on a calendar meeting, a meeting agenda document, and other suitable data. The list of invited users 115 can include users that have a corresponding client device 206. Each corresponding client device 206 can be enrolled with the management service 241. Accordingly, the management service 241 and/or the managed control application 259 can be configured to control certain operations of the client device 206. Each client device 206 can have a managed application 245 that enforces one or more instructions received from the managed control application 259 and/or the management service 241.

In block 404, the managed control application 259 can detect a particular client device 206 of an uninvited user. In some examples, the managed control application 259 can identify every client device 206 that has entered a meeting room 103 from data provided by the meeting room devices 209 (e.g., beacon, sensors, wireless access points, camera, thermostats, etc.) and other nearby client devices 206 in the meeting room 103.

For example, each client device 206 can be detected using nearby application programming interfaces (APIs) based on Bluetooth Low Energy, Near Field Communication (NFC), sound detection and other suitable detection techniques. In some examples, a peer-to-peer nearby API can be used. Some non-limiting examples of P2P nearby API can include Nearby Connections API by Google®, Nearby Messages API by Google®, Nearby Interactions by Apple®, and other suitable P2P nearby API services. In some instances, each managed application 245 (e.g., even a uninvited user's client device 206) can report its location data and its location with respect to nearby client devices 206 to the managed control application 259.

In some examples, the location of the client devices 206 can be determined based on a beacon notification received by one of the meeting room devices 209 (e.g., WI-FI access point, thermostat, lighting device, camera, etc.) in the meeting room 103. Multiple beacon notifications can use a receive strength signal indicator (RSSI) to determine a location of the client device and whether the location is situated in the meeting room 103. The location of each of the meeting room devices 209 can be known on a floor layout 100 or can be known within a meeting room 103. Thus, the beacon notification and the known location of the meeting room device 209 can be used to identify a location of the client device 206 and whether the client device 206 has entered or left a particular meeting room 103. The beacon notifications can be transmitted over Bluetooth Low Energy, NFC, and other suitable location detection techniques.

Upon the detection of a client device, 206, the managed control application 259 can determine a device identifier for the client device 206. The device identifier can be used to determine whether a user associated with the device identifier is on the list of invited users 115. If the device identifier is not associated with one of the invited users, then the managed control application 259 can classify the particular client device 206 as being associated with an uninvited user.

In block 407, the managed control application 259 can transmit an uninvited user notification to the remote computing device received from (e.g., the management service 241). The uninvited user notification can include a device identifier of the client device 206, meeting room data 236, event data 239, and other suitable data. In some examples, the management service 241 can cross-verify the location of the client devices 206 for the invited users and the client device 206 of the uninvited user. The management service 241 can correlate data with the directory service 243.

In block 410, the managed control application 259 can receive a remedial command from the remote computing device. In some instances, the remedial command can direct to the managed control application 259 to refer to a meeting room policy to identify a remedial action. In other instances, the remedial command can specify a remedial action for the managed control application 259 to perform. Some non-limiting examples of a remedial action can include transmitting a remedial notification to the meeting room devices 209 and/or the client device 206 in the meeting room 103.

The remedial notifications for the client device 206 can include a user interface prompt dynamically displayed. The user interface prompt can include a text, for example, indicating that an uninvited user is in the meeting room 103 and to please refrain from discussing confidential material. The client device 206 of the uninvited user can receive a notification indicating that you are not authorized to be in the meeting room 103 and to leave immediately.

In block 413, the managed control application 259 can enforce a remedial action on the devices in the meeting room environment 215. In addition to the notifications, the managed control application 259 can identify the remedial action to execute for the client device 206 and/or the meeting room devices 209 based on the meeting room policy. For example, the client device 206 of the uninvited user can be locked and/or the memory can be wiped in addition to receiving a notification to leave the meeting room 103.

The remedial actions for the meeting room devices 209 can be based on a device type for each meeting room device 209. Some non-limiting examples of remedial actions can include placing the device in sleep or a suspension mode, disabling a device display, disabling audio playback of a speaker, disabling a microphone from capturing audio, manipulating a lighting device to a different lighting effect (e.g., dimming the lights, flicking the lights, etc.), manipulating an electronically-control blinds or shades, and other suitable actions for meeting room devices 209. In some examples, the managed control application 259 can determine a state or a degree of the remedial action for each meeting room device 209.

In some implementations, after the remedial action has been determined, the managed control application 259 can transmit a remedial instruction to the meeting room device 209. The managed application 245 for each meeting room device 209 can receive the remedial instruction and execute the remedial instruction. In some instances, the meeting room device 209 can send an acknowledgement to the managed control device 106 that the remedial instruction has been performed.

In block 416, the managed control application 259 can determine whether an exception has been made for the uninvited user. After the remedial actions have been performed, the managed control application 259 can receive an exception notification from a client device 206 of an invited user (e.g., meeting host or presenter). The exception notification indicates that the uninvited user has been manually approved to attend the meeting. The managed application 245 for an invited user can display a user interface for permitting the uninvited user. In some examples, the managed control application 259 submits a query to management service 241 to determine whether the client device 206 is compliant to a policy (e.g., a security checklist). If the exception notification is received, the managed control application 259 can proceed to block 422. If the exception notification is not received, the managed control application 259 can proceed to block 419.

In block 419, the managed control application 259 can determine whether the client device 206 of the uninvited user has left the meeting room 103. The managed control application 259 can continuously monitor the location of the client device 206 of the uninvited user. The client device 206 of the uninvited user can be monitored using the previous described methods, such as beacon notifications, peer-2-peer communications, nearby APIs, location data from the client device 206, and other suitable location detection techniques.

If the client device 206 of the uninvited user has left the meeting room 103, the managed control application 259 can proceed to block 422. If the client device 206 of the uninvited user has not left the meeting room 103, the managed control application 259 can proceed to block 425.

In block 422, the managed control application 259 can release the remedial action that has been performed in the meeting room environment 215. In some examples, the managed control application 259 can verify whether the client device 206 of the uninvited user is in compliance prior to releasing the remedial action. For instance, the management service 241 can transmit a notification that the client device 206 of the uninvited user is in compliance. In some examples, the release of the remedial action can involve transmitting instructions to the meeting room device 209 and/or the client device 206 to revert back to a previous operating state (e.g., resume displaying content, resume audio playback of a speaker, manipulating lighting device to a previous state, etc.). In some examples, the managed control application 259 can verify the release of the remedial action with the management service 241.

In block 425, the managed control application 259 can determine whether the time period for the scheduled meeting has expired. If the time period for the meeting has expired, the managed control application 259 can proceed to the end. If the time period for the meeting has not expired, the managed control application 259 can proceed to block 416.

Figure 5:
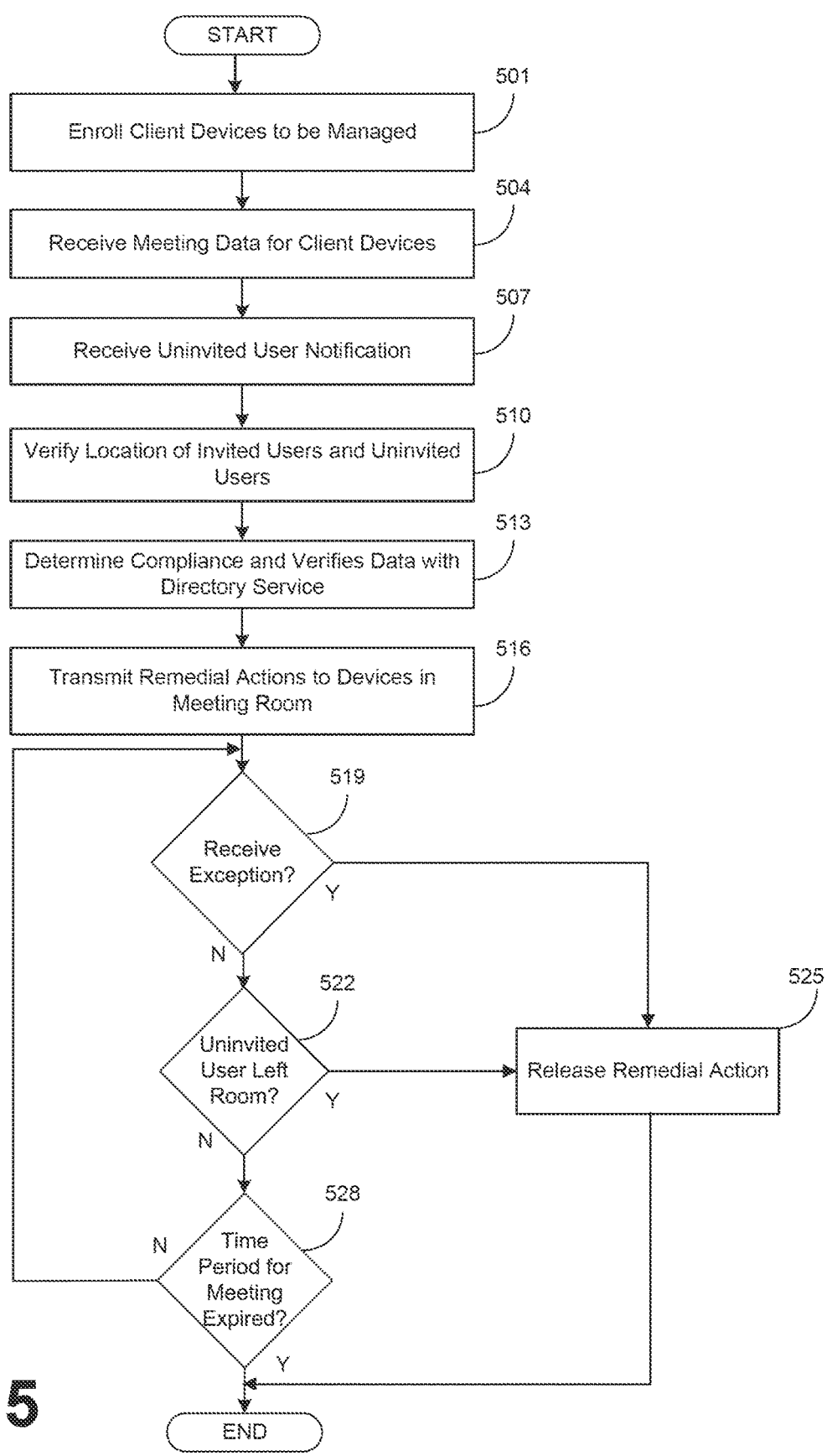
FIG. 5 is a flowchart illustrating one example of functionality implemented as portions of a service executed in a computing environment in the network environment of FIG. 2 according to various embodiments of the present disclosure.

Turning now to FIG. 5, shown is a flowchart that provides one example of the operation of a portion of the management service 241. The flowchart of FIG. 5 provides merely an example of the many different types of functional arrangements that can be employed to implement the operation of the depicted portion of the management service 241. As an alternative, the flowchart of FIG. 5 can be viewed as depicting an example of elements of a method implemented within the network environment 200.

Beginning with block 501, the management service 241 can enroll client devices 206 to be managed. The enrollment can include a process that generates a user profile 221 for a user of the client device 206 and generates device data 233 for the client device 206. In some instances, a user can have multiple devices enrolled to their user profile 221, such as a mobile phone device, a smart watch, a fitness tracking device, a tablet device, smart glasses, and other suitable portable devices. Each device can have a unique device identifier that is stored in the user profile 221.

In block 504, the management service 241 can receive meeting data 230 from one or more client devices 206 and/or can receive meeting rooms data 236 from the managed control device 106. The meeting data 230 and/or the meeting room data 236 can include scheduled meetings, a list of invited users, a meeting location, and other suitable data.

In block 507, the management service 241 can receive an uninvited user notification from the managed control device 106 and/or from the client device 206. The uninvited user notification can include a device identifier of the client device 206 for the uninvited user, which can be used to identify a user profile 221.

In block 510, the management service 241 can verify the location of the client devices 206 for the invited users and the uninvited user. The management service 241 can receive location data from the client device 206. In some examples, the management service 241 can verify whether the location of the client devices 206 for the invited users and uninvited users based on a floor layout 100. In some examples, the management service 241 can received nearby API data from the client device 206 and/or the managed control application 259 to verify the location of the client device 206 of the uninvited user.

In block 513, the management service 241 can determine whether the client device 206 of the uninvited user is in compliance. For example, the management service 241 can determine whether the client device 206 has indications of being compromised, such as a malicious virus signature is detected, a prohibited application has been installed, and other suitable indicators of a compromised device. In another example, the management service 241 can check whether the client device 206 has an appropriate application installed, an appropriate version of an installed application, has appropriate configuration settings (e.g., microphone disable, camera disable,) and other compliance checks. A list of items can be checked for a compliance based on a policy configured by user.

Additionally, the management service 241 can verify or correlate data associated with the client device 206 with the directory service 243. The management service 241 can verify with the directory service 243 if the user profile 211 of the uninvited user has the credentials/permission to attend the meeting.

In block 516, the management service 241 can transmit a remedial notification and/or a remedial action to the meeting room environment 215, such as the managed control device 106, the meeting room device 209, the client device 206 of the invited users and uninvited users, and other suitable devices. The remedial notification can be sent to the client devices of the invited users in order to inform the invited users of an uninvited user in the meeting room 103.

In some examples, the management service 241 can transmit the remedial action to the managed control device 106. In some instances, the remedial action can include an instruction to apply a suspension policy, which was configured by a user (e.g., an administrative user), to the meeting room environment 215. The remedial action can include the device identifier of the client device 206 of the uninvited user. In some instances, the remedial action can indicate whether the client device 206 is in a compliance state.

In block 519, the management service 241 can determine whether an exception has been made for the uninvited user. After the remedial actions have been performed, the management service 241 can receive an exception notification from a client device 206 of an invited user (e.g., meeting host or presenter) and/or from the managed control device 106. The exception notification indicates that the uninvited user has been manually approved to attend the meeting. The managed application 245 for an invited user can display a user interface for permitting the uninvited user. In some examples, the exception notification can be submitted to the management service 241 for approval. If the exception notification is received and approved, the management service 241 can proceed to block 525. If the exception notification is not received or is not approved, the management service 241 can proceed to block 522.

In block 522, the management service 241 can determine whether the client device 206 of the uninvited user has left the meeting room 103. The management service 241 can continuously monitor the location of the client device 206 of the uninvited user. The client device 206 of the uninvited user can be monitored using the previous described methods, such as beacon notifications, peer-2-peer communications, nearby APIs, location data from the client device 206, and other suitable location detection techniques.

If the client device 206 of the uninvited user has left the meeting room 103, the management service 241 can proceed to block 525. If the client device 206 of the uninvited user has not left the meeting room 103, the management service 241 can proceed to block 528.

In block 525, the management service 241 can instruct the managed control device 106 to release the remedial action that has been performed in the meeting room environment 215. In some examples, the management service 241 can verify whether the client device 206 of the uninvited user is in compliance prior to releasing the remedial action.

In block 528, the management service 241 can determine whether the time period for the scheduled meeting has expired. If the time period for the meeting has expired, the management service 241 can proceed to the end. If the time period for the meeting has not expired, the management service 241 can proceed to block 519.

Figure 6:
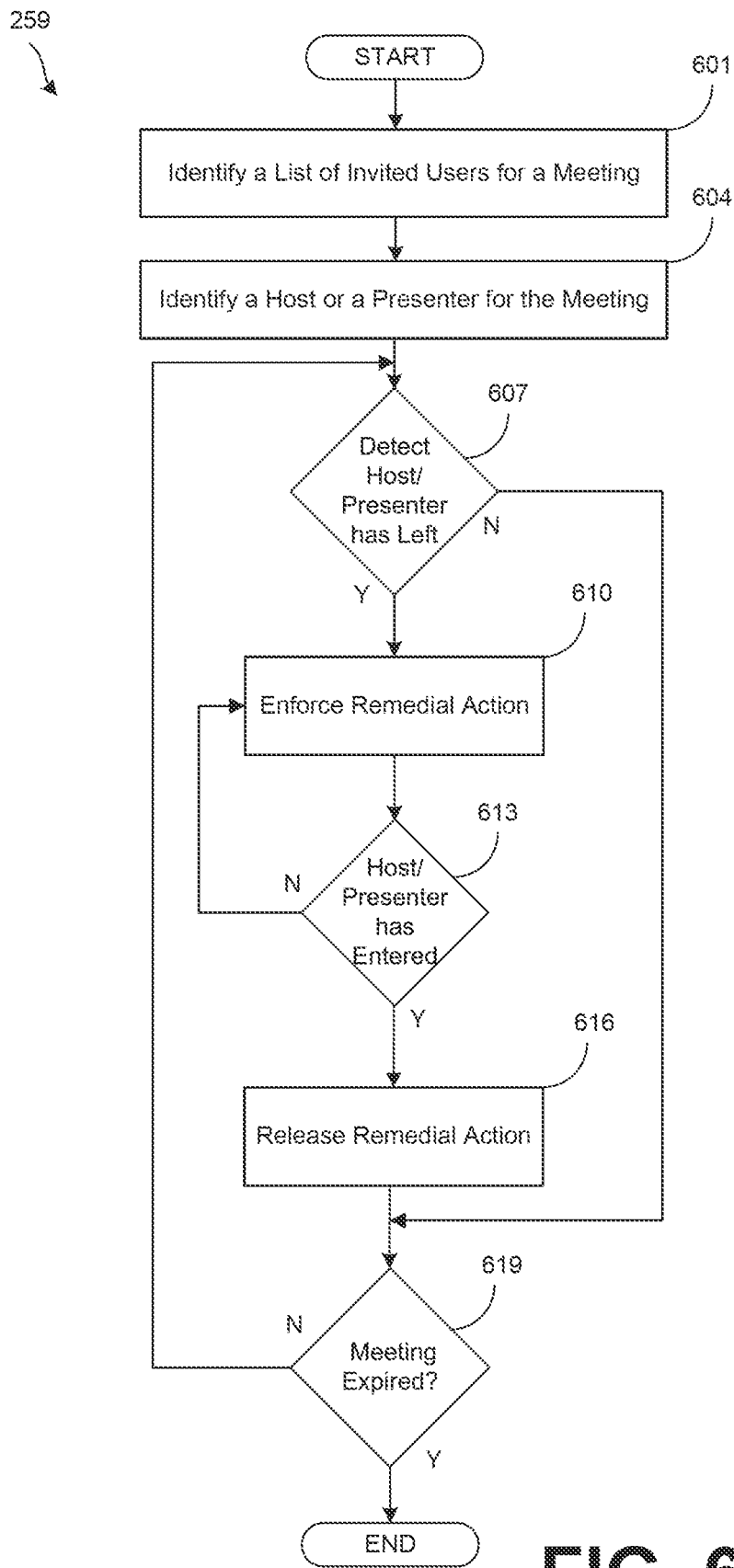
FIG. 6 is a flowchart illustrating one example of functionality implemented as portions of an application executed in a meeting room environment in the network environment of FIG. 2 according to various embodiments of the present disclosure.

Moving on to FIG. 6, shown is a flowchart that provides one example of the operation of a portion of the managed control application 259. The flowchart of FIG. 6 provides merely an example of the many different types of functional arrangements that can be employed to implement the operation of the depicted portion of the managed control application 259. As an alternative, the flowchart of FIG. 6 can be viewed as depicting an example of elements of a method implemented within the network environment 200.

Beginning with block 601, the managed control application 259 can identify a list of invited users 115 for a meeting at a meeting room 103. The list of invited users 115 can be identified based on a calendar meeting, a meeting agenda document, and other suitable data. The list of invited users 115 can include users that have a corresponding client device 206. Each corresponding client device 206 can be enrolled with the management service 241. Accordingly, the management service 241 and/or the managed control application 259 can be configured to control certain operations of the client device 206. Each client device 206 can have a managed application 245 that enforces one or more instructions received from the managed control application 259 and/or the management service 241.

In block 604, the managed control application 259 can identify a host or a presenter for the meeting. The host can be identified as the meeting organizer. For example, the client device 206 of the user that sent the meeting request. In some examples, the presenter can be identified from an agenda incorporated in an email, a word document, and other files. In some instances, a presenter can be identified for different time slots for a meeting. For example, the agenda can indicate that a presenter for the first thirty minutes will be a first user and a second user will be the presenter for the second thirty minutes. In another example, the presenter can be identified based on a detection of a particular client device 206 (e.g., laptop, mobile device) that is connected to a display device 112 for sharing content.

In block 607, the managed control application 259 can detect when a particular client device 206 of the host or the presenter has left the meeting room 103. In some examples, the managed control application 259 can identify the location of the client device 206 for the host or a presenter based on the previously described location detection techniques and data. Some non-limiting examples can include detecting the client device 206 using nearby application programming interfaces (APIs) based on Bluetooth Low Energy, Near Field Communication (NFC), sound detection, and other suitable detection techniques. In some examples, a peer-to-peer nearby API can be used. Some non-limiting examples of P2P nearby API can include Nearby Connections API by Google®, Nearby Messages API by Google®, Nearby Interactions by Apple®, and other suitable P2P nearby API services.

In another example, the mobile phone of the user can be detected outside of the meeting room 103 and the laptop of the user can still be detected in the meeting room 103 and connected to the display device 112. Then, the user can be identified as a presenter that has left the meeting room 103.

If the client device 206 of the host or presenter has left, the managed control application 259 can proceed to block 610. If the client device 206 of the host or presenter has not left, the managed control application 259 can proceed to block 619.

In block 610, the managed control application 259 can enforce a remedial action on the meeting room environment 215. In this context, the remedial action can include to apply a suspension policy to the meeting room devices 209 and/or the client devices 206 in the meeting room environment 215.

In block 613, the managed control application 259 can detect when a particular client device 206 of the host or the presenter has entered the meeting room 103. If the client device 206 of the host or presenter has entered or re-entered, the managed control application 259 can proceed to block 616. If the client device 206 of the host or presenter has not left, the managed control application 259 can proceed to block 610.

In block 616, the managed control application 259 can release the remedial action that has been performed in the meeting room environment 215. The release can include resuming a previous operating state of the meeting room devices 209 and/or the client devices 206 of the invited users.

In block 619, the managed control application 259 can determine whether the time period for the scheduled meeting has expired. If the time period for the meeting has expired, the managed control application 259 can proceed to the end. If the time period for the meeting has not expired, the managed control application 259 can proceed to block 607.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 and the sequence diagram of FIG. 3 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 4-6 and sequence diagram of FIG. 3 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 4-6 and sequence diagram of FIG. 3 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
  a plurality of beacon devices, each of which is located at a known location within a meeting room;
  a computing device comprising a processor and a memory; and
  machine-readable instructions stored in the memory that, when executed by the processor, cause the computing device to at least:
    communicate with the beacon devices and locate client devices with respect to the known locations of the beacon devices based on signal strengths of beacon notifications received by the beacon devices from the client devices, and determine whether or not the locations of the client devices are situated within the meeting room;
    compare device identifiers of the client devices determined to have locations that are within the meeting room with device identifiers of client devices of invited users to detect whether or not client devices of uninvited users are present in the meeting room;
    transmit an uninvited user notification to a remote computing device in response to detecting that a client device of an uninvited user is present in the meeting room; and
    upon receiving a suspension command for the meeting room from the remote computing device in response to the uninvited user notification, execute a suspension action on a meeting room device located in the meeting room.

2. The system of claim 1, wherein the suspension action comprises transmitting a command to the meeting room device to disable a display of the meeting room device or a playback of the meeting room device.

3. The system of claim 2, wherein the machine-readable instructions, when executed by the processor, cause the computing device to at least:
  in response to receiving an exception notification from a client device of an invited user for the meeting, the exception notification indicating that the device identifier of the uninvited user has been added to a list of device identifiers of invited users for the meeting, issue a command to the meeting room device to re-enable the display of the meeting room device or the playback of the meeting room device.

4. The system of claim 1, wherein the meeting room device comprises at least one of a display device, a speaker device, a lighting device, or a window screen device.

5. The system of claim 1, wherein the client devices of the invited users are managed by the remote computing device, and each have a managed application that is used by the remote computing device to control the respective client device.

6. The system of claim 1, wherein the invited users for the meeting occurring in the meeting room are identified based on a meeting calendar.

7. The system of claim 1, wherein the uninvited user notification includes a device identifier of the client device of the uninvited user or a user identifier associated with the uninvited user.

8. A method of managing a meeting room in which each of a plurality of beacon devices is located at a known location within the meeting room, comprising:
- communicating with the beacon devices and locating client devices with respect to the known locations of the beacon devices based on signal strengths of beacon notifications received by the beacon devices from the client devices, and determining whether or not the locations of the client devices are situated within the meeting room;
- comparing device identifiers of the client devices determined to have locations that are within the meeting room with device identifiers of client devices of invited users to detect whether or not client devices of uninvited users are present in the meeting room;
- transmitting an uninvited user notification to a remote computing device in response to detecting that a client device of an uninvited user is present in the meeting room; and
- upon receiving a suspension command for the meeting room from the remote computing device in response to the uninvited user notification, executing a suspension action on a meeting room device located in the meeting room.

9. The method of claim 8, wherein the suspension action comprises transmitting a command to the meeting room device to disable a display of the meeting room device or a playback of the meeting room device.

10. The method of claim 9, further comprising:
- in response to receiving an exception notification from a client device of an invited user for the meeting, the exception notification indicating that the device identifier of the uninvited user has been added to a list of device identifiers of invited users for the meeting, issuing a command to the meeting room device to re-enable the display of the meeting room device or the playback of the meeting room device.

11. The method of claim 8, wherein the meeting room device comprises at least one of a display device, a speaker device, a lighting device, or a window screen device.

12. The method of claim 8, wherein the client devices of the invited users are managed by the remote computing device, and each have a managed application that is used by the remote computing device to control the respective client device.

13. The method of claim 8, wherein the invited users for the meeting occurring in the meeting room are identified based on a meeting calendar.

14. The method of claim 8, wherein the uninvited user notification includes a device identifier of the client device of the uninvited user or a user identifier associated with the uninvited user.

15. A non-transitory, computer-readable medium, comprising machine readable instructions that, when executed by a processor of a computing device, cause the computing device to carry out a method of managing a meeting room in which each of a plurality of beacon devices is located at a known location within the meeting room, said method comprising:
- communicating with the beacon devices and locating client devices with respect to the known locations of the beacon devices based on signal strengths of beacon notifications received by the beacon devices from the client devices, and determining whether or not the locations of the client devices are situated within the meeting room;
- comparing device identifiers of the client devices determined to have locations that are within the meeting room with device identifiers of client devices of invited users to detect whether or not client devices of uninvited users are present in the meeting room;
- transmitting an uninvited user notification to a remote computing device in response to detecting that a client device of an uninvited user is present in the meeting room; and
- upon receiving a suspension command for the meeting room from the remote computing device in response to the uninvited user notification, executing a suspension action on a meeting room device located in the meeting room.

16. The non-transitory, computer-readable medium of claim 15, wherein the suspension action comprises transmitting a command to the meeting room device to disable a display of the meeting room device or a playback of the meeting room device.

17. The non-transitory, computer-readable medium of claim 15, wherein said method further comprises:
- in response to receiving an exception notification from a client device of an invited user for the meeting, the exception notification indicating that the device identifier of the uninvited user has been added to a list of device identifiers of invited users for the meeting, issuing a command to the meeting room device to re-enable the display of the meeting room device or the playback of the meeting room device.

18. The non-transitory, computer-readable medium of claim 15, wherein the meeting room device comprises at least one of a display device, a speaker device, a lighting device, or a window screen device.

19. The non-transitory, computer-readable medium of claim 15, wherein the client devices of the invited users are managed by the remote computing device, and each have a managed application that is used by the remote computing device to control the respective client device.

20. The non-transitory, computer-readable medium of claim 15, wherein the invited users for the meeting occurring in the meeting room are identified based on a meeting calendar.

* * * * *